(12) United States Patent
Honda et al.

(10) Patent No.: US 7,124,577 B2
(45) Date of Patent: Oct. 24, 2006

(54) VEHICULAR STEERING CONTROL DEVICE

(75) Inventors: Nobuhisa Honda, Oyama (JP); Shuuji Hori, Oyama (JP); Sadao Nunotani, Oyama (JP); Naoki Ishizaki, Minamikawachi-machi (JP); Hisashi Asada, Oyama (JP)

(73) Assignee: Komatsu Ltd., Tokyo (JP)

( * ) Notice: Subject to any disclaimer, the term of this patent is extended or adjusted under 35 U.S.C. 154(b) by 51 days.

(21) Appl. No.: 11/004,815

(22) Filed: Dec. 7, 2004

(65) Prior Publication Data
US 2005/0126165 A1    Jun. 16, 2005

(30) Foreign Application Priority Data
Dec. 10, 2003  (JP)  ............................ 2003-411767

(51) Int. Cl.
*F16D 31/02*    (2006.01)
(52) U.S. Cl. .................... 60/450; 60/452; 60/494; 91/421
(58) Field of Classification Search .............. 60/422, 60/327, 450, 452, 459, 384, 484, 494; 91/412, 91/444, 446, 421
See application file for complete search history.

(56) References Cited
U.S. PATENT DOCUMENTS 4,043,419 A * 8/1977 Larson et al. ............... 60/450
4,343,151 A * 8/1982 Lorimor ...................... 60/422
4,454,716 A * 6/1984 Rau ............................. 60/422
5,927,072 A * 7/1999 Vannette ..................... 60/452

FOREIGN PATENT DOCUMENTS

| JP | 56-70106 | 6/1981 |
| JP | 6-117402 | 4/1994 |
| JP | 11-115780 | 4/1999 |

* cited by examiner

*Primary Examiner*—Igor Kershteyn
(74) *Attorney, Agent, or Firm*—Wenderoth, Lind & Ponack, L.L.P.

(57) ABSTRACT

The present invention lowers energy loss while at the same time enhancing the responsiveness of a steering control system. When a steering controller is operated rapidly, the aperture area of a steering flow control valve 4 rapidly increases, and the differential pressure (Pp'-PL) across the steering flow control valve 4 rapidly decreases. When the differential pressure (Pp'-PL) across the steering flow control valve 4 rapidly decreases, a flow control valve 6 is biased by the spring force of a spring 6f and quickly moves to the side of a valve position 6b to increase the differential pressure (Pp'-PL) and make it correspond to a set pressure. Thus, the pressure oil of a surplus flow α, which up to this point has been flowing to a discharge oil line 7, is quickly supplied from the flow control valve 6 to a steering hydraulic cylinder 5 via the steering flow control valve 4. Thus, an output Q' starts quickly relative to an input St.

2 Claims, 4 Drawing Sheets

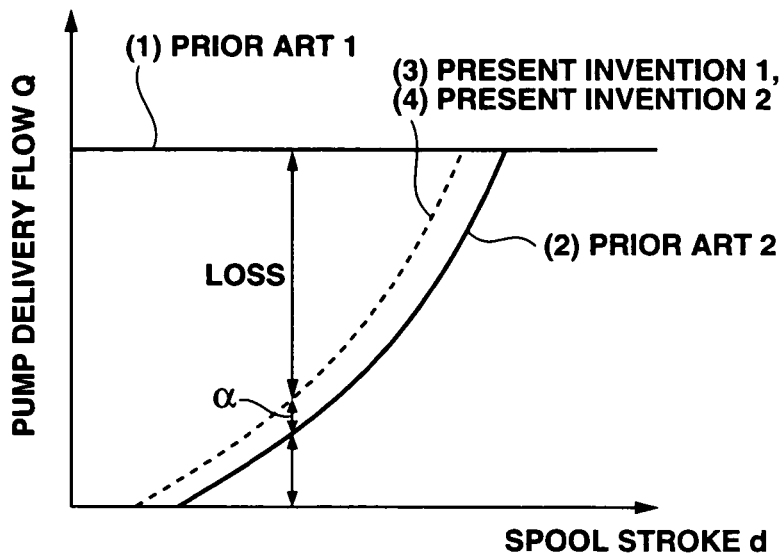
FIG.3
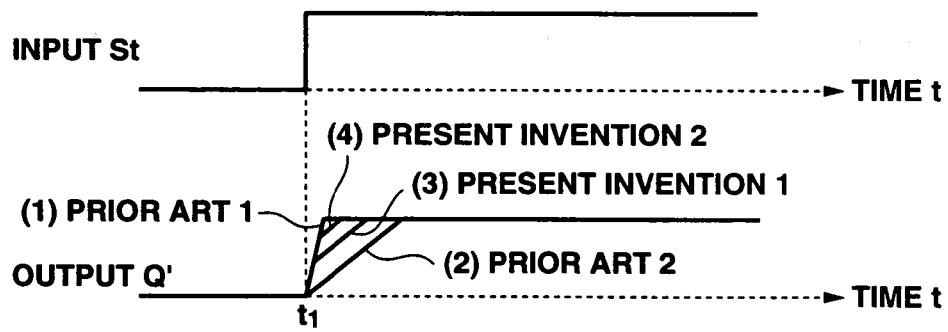
FIG.4
|  | (1) PRIOR ART 1 | (2) PRIOR ART 2 | (3) PRESENT INVENTION 1 (4) PRESENT INVENTION 2 |
|---|---|---|---|
| LOSS | ✕ | ○ | ○ |
| RESPONSE | ○ | ✕ | ○ |
FIG.5

VEHICULAR STEERING CONTROL DEVICE

BACKGROUND OF THE INVENTION

1. Field of the Invention

The present invention is related to a work vehicle, such as a wheel loader, forklift and so forth, and more particularly to a device for controlling vehicular steering.

2. Description of the Related Art

In a wheel loader, forklift or other such work vehicle, the steering mechanism of the vehicle is driven and controlled, and the direction of travel of the vehicle is changed in accordance with the operation of a controller, such as a steering handle, lever or the like.

(Prior Art 1)

FIG. 6 shows a conventional steering drive control hydraulic circuit, which is employed in a work vehicle. In this hydraulic circuit, pressure oil of a fixed delivery capacity is delivered from a fixed capacity-type hydraulic pump 22.

That is, a fixed capacity-type hydraulic pump 22 is driven, for example, by an engine 1. An oil line 23a is connected to the discharge opening of the fixed capacity-type hydraulic pump 22. This oil line 23a is linked to the input port of a flow control valve 36. The output port of the flow control valve 36 is linked to an oil line 23b. The oil line 23b is linked to an input port of the upstream side, as seen from the hydraulic pump 22, of a steering flow control valve 24. The steering flow control valve 24 has valve positions 24a, 24b, 24c. Valve position 24a is the valve position for supplying pressure oil to the one oil chamber 5a of a steering hydraulic cylinder 5 and for discharging pressure oil of the other oil chamber 5b to a tank 9; valve position 24b is the valve position for supplying pressure oil to the one oil chamber 5b of the steering hydraulic cylinder 5 and for discharging pressure oil of the other oil chamber 5a to the tank 9; and valve position 24c is the neutral valve position for shutting off the supply of pressure oil to the steering hydraulic cylinder 5. The steering flow control valve 24 is equipped with pilot ports 24d, 24e, and hydraulic signals S1, S2 corresponding to steering drive command signals are applied to each of the pilot ports 24d, 24e. When hydraulic signal S1 is applied to pilot port 24d, the steering flow control valve 24 is positioned on the side of valve position 24a, and when hydraulic signal S2 is applied to pilot port 24e, the steering flow control valve 24 is positioned on the side of valve position 24b.

Input-output ports of the downstream side, as seen from the hydraulic pump 22, of the steering flow control valve 24 are linked, respectively, to oil chambers 5a, 5b of the steering hydraulic cylinder 5 via oil lines 23c, 23d. A tank port of the steering flow control valve 24 is linked to the tank 9 via oil line 23e.

A rod of the steering hydraulic cylinder 5 is connected to the steering mechanism, and the steering mechanism operates in accordance with the telescopic motion of the rod of the steering hydraulic cylinder 5, changing the turning radius of the vehicle.

The operation of the steering drive control hydraulic circuit of FIG. 6 will be explained.

It is supposed that a steering controller, such as a steering handle, steering operating lever or the like was operated, and a steering drive command signal was generated. Here, a steering drive command signal is a signal that indicates an operators intention to change the orientation of the vehicle, and this signal is generated when an operation has been performed for changing the orientation of the vehicle from a straight forward state to a turning state, or when an operation has been performed for further increasing or decreasing turning from a steady turning state.

When a steering drive command signal is generated, either hydraulic signal S1 or S2 corresponding to this steering drive command signal is applied to either pilot port 24d or 24e of the steering flow control valve 24.

When hydraulic signal S1 is applied to pilot port 24d of the steering flow control valve 24, the steering flow control valve 24 is positioned on the side of valve position 24a. Thus, pressure oil delivered from fixed capacity-type hydraulic pump 22 is supplied to oil chamber 5a of the steering hydraulic cylinder 5 as pressure oil required by the steering flow control valve 24 by way of oil line 23a, flow control valve 36, oil line 23b, steering flow control valve 24 and oil line 23c. Also, unnecessary pressure oil in the flow control valve 36 is discharged to the tank 9 via an oil line 23p. Further, return pressure oil of oil chamber 5b of the steering hydraulic cylinder 5 is discharged to the tank 9 by way of oil line 23d, the steering flow control valve 24 and oil line 23e. In accordance with this, for example, the left-turn turning radius of the vehicle changes.

Further, when hydraulic signal S2 is applied to pilot port 24e of the steering flow control valve 24, the steering flow control valve 24 is positioned on the side of valve position 24b. Thus, pressure oil delivered from the fixed capacity-type hydraulic pump 22 is supplied to oil chamber 5b of the steering hydraulic cylinder 5 as pressure oil required by the steering flow control valve 24 by way of oil line 23a, flow control valve 36, oil line 23b, the steering flow control valve 24 and oil line 23d. Also, unnecessary pressure oil in the flow control valve 36 is discharged to the tank 9 via oil line 23p. Further, return pressure oil of oil chamber 5a of the steering hydraulic cylinder 5 is discharged to the tank 9 by way of oil line 23c, the steering flow control valve 24 and oil line 23e. In accordance with this, for example, the right-turn turning radius of the vehicle changes.

(Prior Art 2)

Further, as shown in FIG. 7, a steering drive control hydraulic circuit that carries out capacity control by using a variable capacity-type hydraulic pump 2 instead of a fixed capacity-type hydraulic pump 22 is also known in the art.

That is, the variable capacity-type hydraulic pump 2, for example, is driven by an engine 1. An oil line 33a is connected to the discharge opening of the variable capacity-type hydraulic pump 2. This oil line 33a is linked to an input port of the upstream side, as seen from the hydraulic pump 2, of a steering flow control valve 4. The steering flow control valve 4 has valve positions 4a, 4b, 4c. Valve position 4a is the valve position for supplying pressure oil to the one oil chamber 5a of a steering hydraulic cylinder 5 and for discharging pressure oil of the other oil chamber 5b to a tank 9; valve position 4b is the valve position for supplying pressure oil to the one oil chamber 5b of the steering hydraulic cylinder 5 and for discharging pressure oil of the other oil chamber 5a to the tank 9; and valve position 4c is the neutral valve position for shutting off the supply of pressure oil to the steering hydraulic cylinder 5. The steering flow control valve 4 is equipped with pilot ports 4d, 4e, and hydraulic signals S1, S2 corresponding to steering drive command signals are applied respectively to each of the pilot ports 4d, 4e. When hydraulic signal S1 is applied to pilot port 4d, the steering flow control valve 4 is positioned on the side of valve position 4a, and when hydraulic signal S2 is applied to pilot port 4e, the steering flow control valve 4 is positioned on the side of valve position 4b.

Input-output ports of the downstream side, as seen from the hydraulic pump 2, of the steering flow control valve 4 are linked, respectively, to oil chambers 5a, 5b of the steering hydraulic cylinder 5 via oil lines 33c, 33b. A tank port of the steering flow control valve 4 is linked to the tank 9 via oil line 33d.

A rod of the steering hydraulic cylinder 5 is connected to the steering mechanism, and the steering mechanism operates in accordance with the telescopic motion of the rod of the steering hydraulic cylinder 5, changing the turning radius of the vehicle.

A swash plate 2a of the variable capacity-type hydraulic pump 2 operates by moving in response to the movement of a capacity control valve 10. When the valve position of the capacity control valve 10 moves to the left side in the figure, the swash plate 2a of the variable capacity-type hydraulic pump 2 moves to the side of the minimum inclined rotation angle MIN, and when the valve position of the capacity control valve 10 moves to the right side in the figure, the swash plate 2a of the variable capacity-type hydraulic pump 2 moves to the side of the maximum inclined rotation angle MAX.

A spring 10a for applying a set pressure is disposed on the capacity control valve 10. The pressure of the downstream side of the steering flow control valve 4, that is, the load pressure PL of the steering hydraulic cylinder 5 can be detected as the pressure of outlet port 4f of the downstream side, as seen from the hydraulic pump 2, of the steering flow control valve 4. Outlet port 4f of the steering flow control valve 4 is linked by way of a pilot oil line 12 to a pilot port of the same side as the spring 10a of the capacity control valve 10.

The pressure of the upstream side of the steering flow control valve 4, that is, the delivery pressure Pp of the hydraulic pump 2 can be detected as the pressure inside oil line 33a. Oil line 33a is linked by way of a pilot oil line 11 to a pilot port on the opposite side of the spring 10a of the capacity control valve 10.

The operation of the steering drive control hydraulic circuit of FIG. 7 will be explained.

When a steering drive command signal is generated, either hydraulic signal S1 or S2 corresponding to this steering drive command signal is applied to either pilot port 4d or 4e of the steering flow control valve 4.

When hydraulic signal S1 is applied to pilot port 4d of the steering flow control valve 4, the steering flow control valve 4 is positioned on the side of valve position 4a. Thus, pressure oil delivered from the variable capacity-type hydraulic pump 2 is supplied to oil chamber 5a of the steering hydraulic cylinder 5 by way of oil line 33a, the steering flow control valve 4 and oil line 33c. Further, the return pressure oil of oil chamber 5b of the steering hydraulic cylinder 5 is discharged by way of oil line 33b, the steering flow control valve 4 and oil line 33d to the tank 9. In accordance with this, for example, the left-turn turning radius of the vehicle changes.

Further, when hydraulic signal S2 is applied to pilot port 4e of the steering flow control valve 4, the steering flow control valve 4 is positioned on the side of valve position 4b. Thus, pressure oil delivered from the variable capacity-type hydraulic pump 2 is supplied to oil chamber 5b of the steering hydraulic cylinder 5 by way of oil line 33a, the steering flow control valve 4, and oil line 33b. Further, return pressure oil of oil chamber 5a of the steering hydraulic cylinder 5 is discharged to the tank 9 by way of oil line 33c, the steering flow control valve 4 and oil line 33d. In accordance with this, for example, the right-turn turning radius of the vehicle changes.

The capacity control valve 10 controls the inclined rotation angle of the swash plate 2a of the variable capacity-type hydraulic pump 2, that is, the capacity, such that the differential pressure (Pp-PL) of the pump delivery pressure Pp that works via pilot oil line 11 and the load pressure PL of the steering hydraulic cylinder 5 that works via pilot oil line 12 matches the set pressure corresponding to the spring force of spring 10a. A flow corresponding to the aperture area of the steering flow control valve 4 is thereby supplied to the steering hydraulic cylinder 5 regardless of the load of the steering hydraulic cylinder 5.

The literature cited hereinbelow describes the general state-of-the-art related to the above-mentioned prior art 2.

Japanese Patent Application Laid-open No. 11-115780 discloses an invention, which provides a flow control valve for a working machine in addition to the steering flow control valve 4 shown in FIG. 7, increases the delivery capacity of the variable capacity-type hydraulic pump 2 (for steering) in accordance with the spool stroke (working stroke) of this working machine flow control valve, and supplies this increased portion to the working machine flow control valve.

Further, Japanese Patent Application Laid-open No. 6-117402 discloses an invention, which enhances the operating feel of the control lever regardless of the load of the hydraulic actuator by setting the maximum delivery quantity of a variable capacity-type hydraulic pump in accordance with the revolutions of an engine.

FIG. 3 shows the relationship between the spool stroke d of the steering flow control valve and the pump delivery flow Q in the above-described prior art 1 and prior art 2. Furthermore, it is supposed that this figure shows the relationship when the number of revolutions of the engine 1 is constant.

Further, FIG. 4 shows, on the time (t) base, the output response relative to input when a steering drive command signal St is inputted and the flow passing through the steering flow control valve (supply flow to the steering hydraulic cylinder 5) Q' is outputted.

As shown in FIG. 3 (1), in the case of prior art 1, because a fixed capacity-type hydraulic pump 22 is used, a fixed maximum quantity pump delivery flow is delivered regardless of the spool stroked of the steering flow control valve 24. However, because a quantity of this fixed maximum quantity pump delivery flow that is in excess of the amount needed for steering drive is discharged to a tank 9 without being used for steering drive, energy loss is great.

As shown in FIG. 3 (2), in the case of prior art 2, because a capacity control valve is used, and the delivery flow Q of the variable capacity-type hydraulic pump 2 increases in accordance with an increase in the spool stroke of the steering flow control valve 4, the flow required for steering drive is delivered from the hydraulic pump 2 and is supplied to the steering hydraulic cylinder 5, resulting in extremely low energy loss.

Next, the responsiveness of the hydraulic pump relative to a steering operation will be explained by referring to FIG. 4.

In the case of prior art 1, as shown in FIG. 4 (1), a constant maximum flow is delivered from the fixed capacity-type hydraulic pump 22 regardless of the spool stroke d. Thus, if it is supposed that a steering controller, such as a steering handle, is rapidly moved at a timing of t1, the steering flow control valve 24 will operate pursuant to the generation of a steering drive command signal St and the flow Q' supplied to the steering hydraulic cylinder 5 will rapidly increase. In other words, in the case of prior art 1, the output Q' response in response to the input St, that is, the responsiveness of the steering control system is good.

By contrast, a capacity control valve is employed in the case of prior art 2. When a capacity control valve is used, the differential pressure (Pp-PL) across the steering flow control valve 4 varies pursuant to the generation of a steering drive command signal St. Then, the delivery capacity of the hydraulic pump 2 (inclined rotation angle of the swash plate 2a) varies in accordance with the differential pressure (Pp-PL) across the steering flow control valve 4. Then, the pump delivery quantity changes, and the supply to the steering hydraulic cylinder 5 changes in accordance with the change in the delivery capacity (inclined rotation angle of the swash plate 2a) of the hydraulic pump 2. The steering flow control valve 4 operates in accordance with the steering drive command signal St like this, and the inclined rotation angle of the swash plate 2a of the variable capacity-type hydraulic pump 2 changes in accordance with this operation, and the supply to the steering hydraulic cylinder 5 changes in accordance with this change in the swash plate inclined rotation angle. Therefore, the responsiveness of the steering control system is dependent on the responsiveness of the change in the delivery capacity of the variable capacity-type hydraulic pump 2 (change in the swash plate inclined rotation angle).

Here, the responsiveness of the variable capacity-type hydraulic pump is not as good as the responsiveness of the valves. In particular, there is a big time lag at the startup of operation of the variable capacity-type hydraulic pump. Thus, as shown in FIG. 4 (2), a delay occurs between the time a steering drive command signal St is generated and the swash plate 2a of the variable capacity-type hydraulic pump 2 begins operating, and the increase in the supply flow Q' to the steering hydraulic cylinder 5 is delayed in accordance with this, causing the responsiveness of the steering control system to deteriorate compared to that of prior art 1.

FIG. 5 summarizes the points made hereinabove.

That is, in the case of prior art 1, energy loss is great, but the responsiveness of the steering control system is good. Conversely, in the case of prior art 2, energy loss is small, but the responsiveness of the steering control system is poor.

With the foregoing in view, it is an object of the present invention to reduce energy loss while at the same time enhancing the responsiveness of the steering control system.

SUMMARY OF THE INVENTION

A first invention is a vehicular steering control device for driving vehicular steering by supplying pressure oil from a variable capacity-type hydraulic pump (2) to a steering hydraulic actuator (5) through pressure oil supply lines (3a, 3b, 3c, 3d) in accordance with a steering drive command signal, this vehicular steering control device comprising: a steering flow control valve (4), which is disposed on the pressure oil supply lines (3a, 3b, 3c, 3d), and which operates such that pressure oil of a flow corresponding to the steering drive command signal is supplied to the steering hydraulic actuator (5); a flow control valve (6), which is on the above-mentioned pressure oil supply lines (3a, 3b) and disposed between the variable capacity-type hydraulic pump (2) and the steering flow control valve (4), and which discharges delivery pressure oil of the variable capacity-type hydraulic pump (2) to a tank (9) via a discharge oil line (7) so that a differential pressure across the steering flow control valve (4) constitutes a set value; a restrictor (8) disposed on the discharge oil line (7); and a capacity control section (10) for controlling a capacity of the variable capacity-type hydraulic pump (2) such that a differential pressure across the restrictor (8) constitutes a set value.

A second invention is a vehicular steering control device for driving vehicular steering by supplying pressure oil from a variable capacity-type hydraulic pump (2) to a steering hydraulic actuator (5) through pressure oil supply lines (3a, 3b, 3c, 3d) in accordance with a steering drive command signal, this vehicular steering control device comprising: a steering flow control valve (4), which is disposed on the pressure oil supply lines (3a, 3b, 3c, 3d), and which operates such that pressure oil of a flow corresponding to the steering drive command signal is supplied to the steering hydraulic actuator (5); a flow control valve (26), which is on the pressure oil supply lines (3a, 3b) disposed between the variable capacity-type hydraulic pump (2) and the steering flow control valve (4), and which discharges delivery pressure oil of the variable capacity-type hydraulic pump (2) to a tank (9) via a discharge oil line (7) so that a differential pressure across the steering flow control valve (4) constitutes a set value; a restrictor (8) disposed on the discharge oil line (7); and a capacity control portion (20) for controlling a capacity of the variable capacity-type hydraulic pump (2) such that a differential pressure across the restrictor (8) constitutes a set value, and, in addition, for performing control that increases a capacity of the variable capacity-type hydraulic pump (2) in accordance with a size of the steering drive command signal.

According to the first invention, as shown in FIG. 1, when the steering controller is operated rapidly, the aperture area of the steering flow control valve 4 rapidly increases, and the differential pressure (Pp'-PL) across the a steering flow control valve 4 rapidly decreases. When the differential pressure (Pp'-PL) across the a steering flow control valve 4 rapidly decreases, the flow control valve 6 is biased by the spring force of a spring 6f and rapidly moves to the side of valve position 6b to increase the differential pressure (Pp'-PL) so that it corresponds to a set pressure. Thus, the flow α of a surplus portion of pressure oil that had been flowing up to that point through the discharge oil line 7 is rapidly supplied from the flow control valve 6 to the steering hydraulic cylinder 5 via the steering flow control valve 4.

Thus, output Q' rapidly increases in response to input St (FIG. 4 (3): Present inventions 1).

As a result of the pressure oil inside the discharge oil line 7 being routed to the steering hydraulic cylinder 5, the flow of the pressure oil inside the discharge oil line 7 decreases. Thus, the differential pressure (PR-PT) across the restrictor 8 decreases. When the differential pressure (PR-PT) across the restrictor 8 decreases, the capacity control valve 10 is biased by the spring force of the spring 10a and the valve position moves to the right side in the figure to increase the differential pressure (PR-PT) across the restrictor 8 and make it correspond to a set pressure ΔP, and the swash plate 2a of the variable capacity-type hydraulic pump 2 moves to the side of the maximum inclined rotation angle MAX. The delivery capacity of the variable capacity-type hydraulic pump 2 thereby becomes larger, the delivery flow Q increases, and a flow Q' that corresponds to the steering drive command signal St is supplied to the steering hydraulic cylinder 5 (FIG. 4 (3): Present invention 1). Furthermore, since the differential pressure (Pp'-PL) across the steering control valve 4 increases pursuant to the increase of the flow Q' passing through the steering flow control valve 4, the flow control valve 6 achieves equilibrium at the valve position where the differential pressure (Pp'-PL) corresponds to the set pressure, and the surplus flow α is once again discharged from the flow control valve 6 to the discharge oil line 7. The above-mentioned effect is achieved in the same way even when the steering controller is rapidly operated from a straight forward state, or when an operation is performed so as to rapidly increase the operation speed of the steering controller during a turning operation.

The second invention functions the same as the first invention, but differs from the first invention in the following way.

That is, in the hydraulic circuit of FIG. 2, signal pressure Ps corresponding to a steering drive command signal St acts on a capacity control valve 20, and the swash plate 2a of the variable capacity-type hydraulic pump 2 moves to the side of the maximum inclined rotation angle MAX. In other words, control for starting up the swash plate 2a of the hydraulic pump 2 is commenced before the flow of the pressure oil inside the discharge oil line 7 actually decreases, and the differential pressure (PR-PT) across the restrictor 8 actually drops, further enhancing the responsiveness of the steering system compared to that of the first invention (FIG. 4 (4): present invention 2, FIG. 4 (3): present invention 1).

According to the first invention (present invention 1) and the second invention (present invention 2), as shown in FIG. 5, by comparison to prior art 1 and prior art 2, energy loss can be reduced as with prior art 2, and the responsiveness of the steering control system can be improved as with prior art 1.

In addition, the second invention can enhance the responsiveness of the steering control system more than the first invention.

In other words, whereas control for starting up the swash plate 2a of the hydraulic pump 2 is commenced after the differential pressure across the restrictor 8 actually drops in the first invention, in the second invention, because control for starting up the swash plate 2a of the hydraulic pump 2 has already begun pursuant to the generation of a steering drive command signal St and there is no delay between the differential pressure (PR-PT) across the restrictor 8 actually decreasing and the swash plate 2a of the hydraulic pump 2 starting up, the responsiveness of the steering control system is improved more than in the case of the first invention. Also, because the quantity of oil discharged to the tank 9 by way of the discharge oil line 7 can be reduced to the extent that responsiveness is enhanced, energy loss can be further lowered.

BRIEF DESCRIPTION OF THE DRAWINGS

FIG. 3 is a diagram showing a comparison of the difference in energy loss of the present invention and the prior art;

FIG. 4 is a diagram showing a comparison of the difference in steering control system responsiveness of the present invention and the prior art;

FIG. 5 is a table showing differences in the effects of the present invention and the prior art;

DESCRIPTION OF THE EMBODIMENTS

The embodiments of a vehicular steering control device related to the present invention will be explained hereinbelow by referring to the figures.

Figure 1:
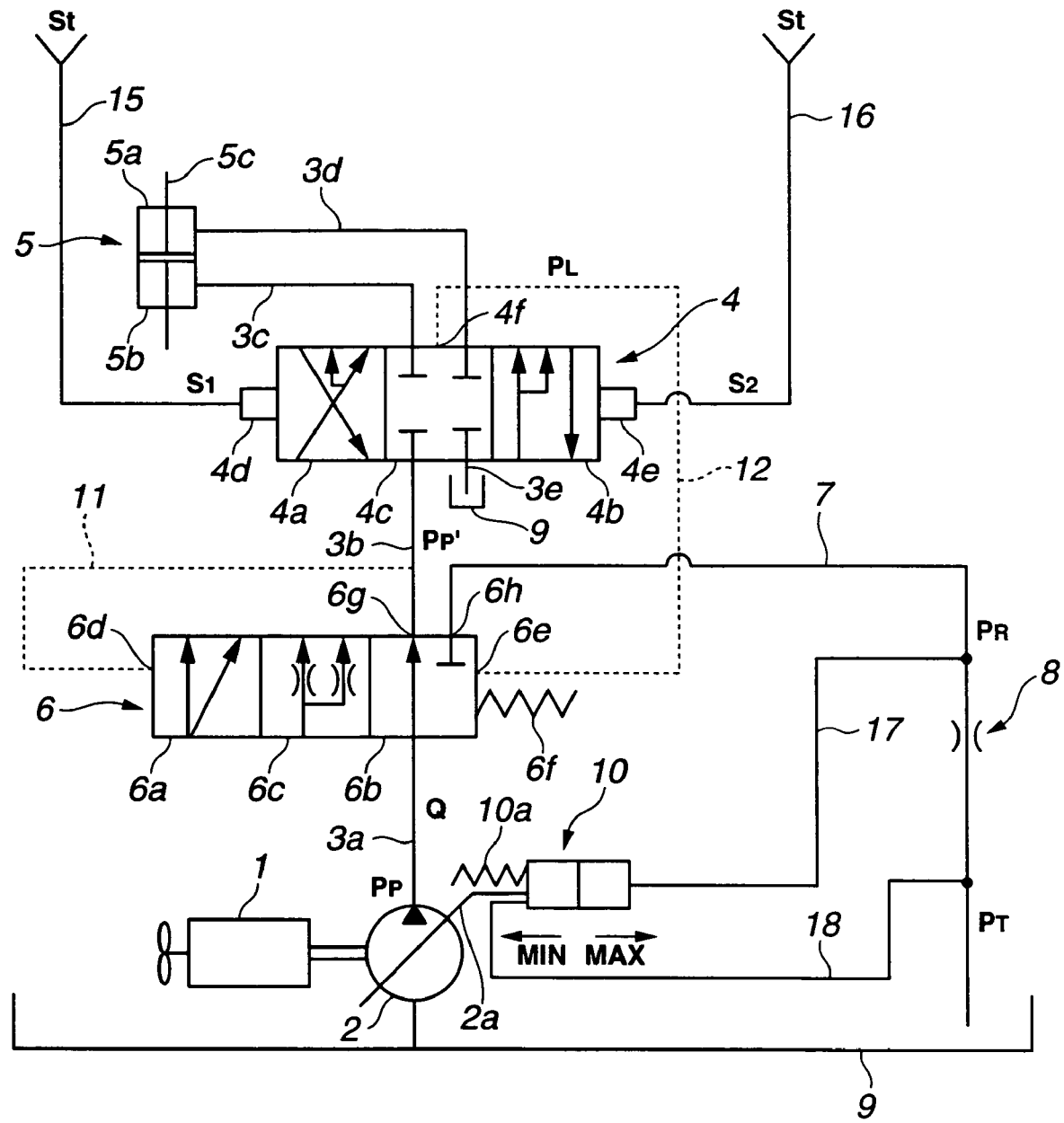
FIG. 1 is a hydraulic circuit diagram of a first embodiment.

FIG. 1 shows a hydraulic circuit for steering drive control of a first embodiment. The hydraulic circuit of FIG. 1 is mounted in a work vehicle, such as, for example, a wheel loader or forklift.

That is, as shown in FIG. 1, a variable capacity-type hydraulic pump 2 is driven by a driving source, such as, for example, an engine 1. An oil line 3a is connected to the discharge opening of the variable capacity-type hydraulic pump 2. This oil line 3a is linked to an input port of the upstream side of a flow control valve 6 as seen from the hydraulic pump 2. A first outlet port 6g of the downstream side of the flow control valve 6, as seen from the hydraulic pump 2, is linked to an oil line 3b, and a second outlet port 6h is linked to a discharge oil line 7. Oil line 3b is linked to an input port of the upstream side of a steering flow control valve 4 as seen from the hydraulic pump 2. Further, the discharge oil line 7 is linked to a tank 9. A restrictor 8 is disposed on the discharge oil line 7.

The flow control valve 6 is provided for controlling the flow of the pressure oil supplied to the steering flow control valve 4, and has valve positions 6a, 6b, 6c. Valve position 6a is the valve position for discharging pressure oil only to the tank 9 by way of outlet port 6h and discharge oil line 7; valve position 6b is the valve position for supplying pressure oil only to the steering flow control valve 4 via outlet port 6g and oil line 3b; and valve position 6c is the valve position for supplying pressure oil to the steering flow control valve 4 via outlet port 6g and oil line 3b, and, in addition, for supplying pressure oil to the tank 9 via outlet port 6h and discharge oil line 7.

A spring 6f for applying a set pressure is disposed on the flow control valve 6. The pressure of the downstream side of the steering flow control valve 4, in other words, the load pressure PL of a steering hydraulic cylinder 5 can be detected as pressure of outlet port 4f of the downstream side, as seen from the hydraulic pump 2, of steering flow control valve 4. Outlet port 4f of the steering flow control valve 4 is linked via a pilot oil line 12 to a pilot port 6e of the same side as the spring 6f of the flow control valve 6.

The pressure of the upstream side of the steering flow control valve 4, that is, the pressure Pp' of the downstream side of the flow control valve 6 can be detected inside the oil line 3b. Oil line 3b is linked via a pilot oil line 11 to a pilot port 6d of the opposite side of the spring 6f of the flow control valve 6.

The steering flow control valve 4 has valve positions 4a, 4b, 4c. Valve position 4a is the valve position for supplying pressure oil to the one oil chamber 5a of the steering hydraulic cylinder 5 and for discharging the pressure oil of the other oil chamber 5b to the tank 9; valve position 4b is the valve position for supplying pressure oil to the one oil chamber 5b of the steering hydraulic cylinder 5, and for discharging the pressure oil of the other oil chamber 5a to the tank 9; and valve position 4c is a neutral valve position for shutting off the supply of pressure oil to the steering hydraulic cylinder 5. The steering flow control valve 4 is equipped with pilot ports 4d, 4e, and hydraulic signals S1, S2 corresponding to steering drive command signals St are applied respectively to the pilot ports 4d, 4e.

In other words, a steering drive command signal St is generated in accordance with the operation of a steering controller, such as a steering handle or steering control lever.

Here, a steering drive command signal St is a signal that indicates an operator's intention to change the orientation of the vehicle, and this signal is generated when an operation for changing the vehicle's orientation from a straight forward state to a turning state is performed, or when an operation for further strengthening or weakening turning from a constant turning state is performed.

Hydraulic signal S1 or S2 corresponding to the command content of the steering drive command signal St is applied to either pilot port 4d or 4e of the steering flow control valve 4.

When hydraulic signal S1 is applied to pilot port 4d, the steering flow control valve 4 is positioned on the side of valve position 4a, and when hydraulic signal S2 is applied to pilot port 4e, the steering flow control valve 4 is positioned on the side of valve position 4b.

The input-output ports of the downstream side, as seen from the hydraulic pump 2, of the steering flow control valve 4 are respectively linked to the oil chambers 5a, 5b of the steering hydraulic cylinder 5 via oil lines 3d, 3c. The tank port of steering flow control valve 4 is linked to the tank 9 via oil line 3e.

The rod of the steering hydraulic cylinder 5 is connected to a steering mechanism, and the steering mechanism operates in accordance with the telescopic motion of the rod of the steering hydraulic cylinder 5, changing the turning radius of the vehicle.

A swash plate 2a of the variable capacity-type hydraulic pump 2 operates by moving in response to the movement of a capacity control valve 10. When the valve position of the capacity control valve 10 moves to the left side in the figure, the swash plate 2a of the variable capacity-type hydraulic pump 2 moves to the side of the minimum inclined rotation angle MIN, and when the valve position of the capacity control valve 10 moves to the right side in the figure, the swash plate 2a of the variable capacity-type hydraulic pump 2 moves to the side of the maximum inclined rotation angle MAX.

A spring 10a for applying a set pressure $\Delta P$ is disposed on the capacity control valve 10.

The flow of discharged pressure oil flowing through the discharge oil line 7 can be detected as the differential pressure (PR-PT) of the differential pressure across the restrictor 8, that is, the pressure PR of the upstream side of the restrictor 8 (the pressure of the outlet port 6h of the flow control valve 6) and the pressure PT of the downstream side of the restrictor 8 (pressure of the tank 9). The capacity control valve 10 controls the swash plate 2a of the variable capacity-type hydraulic pump 2 (capacity) such that the differential pressure (PR-PT) across the restrictor 8 constitutes a set pressure $\Delta P$ corresponding to the spring force of the spring 10a.

In other words, the discharge oil line 7 branches to an oil line 17 on the upstream side of the restrictor 8. The oil line 17 is linked to a pilot port of the side opposite the spring 10a of the capacity control valve 10.

The tank 9 is linked to an oil line 18. The oil line 18 is linked to a pilot port on the same side as the spring 10a of the capacity control valve 10.

Here, the relationship between the delivery flow Q of the variable capacity-type hydraulic pump 2, the set pressure $\Delta P$ of the capacity control valve 10 and the aperture area A of the restrictor 8 will be explained.

FIG. 3 (3) (present invention 1) shows the delivery flow Q of a hydraulic pump 2 of the first embodiment.

The delivery flow Q of a hydraulic pump 2 of the first embodiment is set such that only the surplus flow $\alpha$ becomes greater than the delivery flow of prior art 2. In other words, a flow to which the surplus flow $\alpha$ has been added is delivered from the hydraulic pump 2 to the flow required for steering drive.

Now then, when capacity control valve 10 reaches equilibrium such that the differential pressure (PR-PT) across the restrictor 8 corresponds to the set pressure $\Delta P$, the delivery flow Q (surplus flow $\alpha$) of the hydraulic pump 2, the set pressure $\Delta P$ of the capacity control valve 10 and the aperture area A of the restrictor 8 are set such that the above-mentioned surplus flow $\alpha$ flows in the discharge oil line 7.

The operation of steering drive control hydraulic circuit of FIG. 1 will be explained.

When a steering handle, steering control lever or other such steering controller is operated and a steering drive command signal St is generated, either hydraulic signal S1 or S2 corresponding to this steering drive command signal St is applied to either pilot port 4d or 4e of the steering flow control valve 4.

When hydraulic signal S1 is applied to pilot port 4d of the steering flow control valve 4, the steering flow control valve 4 is positioned on the side of valve position 4a. Thus, pressure oil discharged from the variable capacity-type hydraulic pump 2 is supplied to oil chamber 5a of the steering hydraulic cylinder 5 by way of oil line 3a, the flow control valve 6, oil line 3b, the steering flow control valve 4 and oil line 3d. Further, the return pressure oil of oil chamber 5b of the steering hydraulic cylinder 5 is supplied to the tank 9 via oil line 3c, the steering flow control valve 4 and oil line 3e. The turning radius of, for example, a left turn of the vehicle changes in accordance with this.

Further, when hydraulic signal S2 is applied to pilot port 4e of the steering flow control valve 4, the steering flow control valve 4 is positioned on the side of valve position 4b. Thus, the pressure oil discharged from the variable capacity-type hydraulic pump 2 is supplied to oil chamber 5b of the steering hydraulic cylinder 5 by way of oil line 3a, the flow control valve 6, oil line 3b, the steering flow control valve 4 and oil line 3c. Further, the return pressure oil of oil chamber 5a of the steering hydraulic cylinder 5 is supplied to the tank 9 via oil line 3d, the steering flow control valve 4 and oil line 3e. The turning radius of, for example, a right turn of the vehicle changes in accordance with this.

In the flow control valve 6, the valve position is adjusted such that the differential pressure (Pp'-PL) of the upstream side pressure Pp' of the steering flow control valve 4, which operates via pilot oil line 11, and the downstream side pressure PL (load pressure PL of the steering hydraulic cylinder 5) of the steering flow control valve 4, which operates via pilot oil line 12, corresponds to a set pressure corresponding to the spring force of the spring 6f. A flow corresponding to the aperture area of the steering flow control valve 4 is thereby supplied to the steering hydraulic cylinder 5 regardless of the load of the steering hydraulic cylinder 5.

If it is supposed that the steering controller is now being operated at a normal operating speed, the differential pressure (Pp'-PL) across the steering flow control valve 4 is adjusted by the flow control valve 6 so as to substantially correspond to a set pressure, and the above-mentioned surplus flow $\alpha$ flows to the discharge oil line 7.

Here, it is supposed that the steering controller has been operated rapidly. When the steering controller is operated rapidly, the aperture area of the steering flow control valve 4 quickly increases, and the differential pressure (Pp'-PL) across the steering flow control valve 4 rapidly becomes smaller. When the differential pressure (Pp'-PL) across the steering flow control valve 4 rapidly becomes smaller, the flow control valve 6 is biased by the spring force of the spring 6f and quickly moves to the side of valve position 6b to increase the differential pressure (Pp'-PL) and; make it correspond to the set pressure. Thus, the pressure oil of the surplus flow α, which up to this point had been flowing to the discharge oil line 7, is rapidly supplied from flow control valve 6 to the steering hydraulic cylinder 5 via steering flow control valve 4.

Thus, as shown in FIG. 4 (3), output Q' rapidly increases in response to the input St.

As a result of the pressure oil inside the discharge oil line 7 being diverted to the steering hydraulic cylinder 5, the flow of the pressure oil inside the discharge oil line 7 decreases. Thus, the differential pressure (PR-PT) across the restrictor 8 becomes smaller. When the differential pressure (PR-PT) across the restrictor 8 becomes smaller, the capacity control valve 10 is biased by the spring force of the spring 10a and the valve position moves to the right side in the figure to increase the differential pressure (PR-PT) across the restrictor 8 and make it correspond to the set pressure ΔP, and the swash plate 2a of the variable capacity-type hydraulic pump 2 moves to the maximum inclined rotation angle MAX side. The delivery capacity of the variable capacity-type hydraulic pump 2 is thereby made bigger, and the delivery flow Q is increased, and a flow Q' corresponding to a steering drive command signal St is supplied to the steering hydraulic cylinder 5 (FIG. 4 (3)). Furthermore, because the differential pressure (Pp'-PL) across the steering flow control valve 4 is increased pursuant to the increase of the flow Q' passing through the steering flow control valve 4, the flow control valve 6 achieves equilibrium at the valve position at which the differential pressure (Pp'-PL) corresponds to the set pressure, resulting in the surplus flow α once again being discharged to the discharge oil line 7 from the flow control valve 6.

Next, the first embodiment will be compared against prior art 1 and prior art 2 by referring to FIG. 3 and FIG. 4.

As described hereinabove, in the first embodiment, as shown in FIG. 3 (3) (present invention 1), because the delivery flow Q of the hydraulic pump 2 is set such that only the surplus flow α becomes larger than the delivery flow of prior art 2, energy loss is somewhat poorer compared to that of prior art 2; however, energy loss is markedly lower than with prior art 1.

Further, as described hereinabove, in the first embodiment, as shown in FIG. 4 (3) (present invention 1), because the flow control valve 6 operates such that, even when a steering controller is rapidly operated and a steering drive command signal St is rapidly inputted, the pressure oil of the surplus flow α flowing through the discharge oil line 7 is quickly diverted to the steering hydraulic cylinder 5 in accordance with this rapid input, and the supply flow Q' (output) to the steering hydraulic cylinder 5 follows suit without delay. Thus, the responsiveness of the steering control system is markedly improved compared to prior art 2, and is on a par with that of prior art 1. However, because the capacity control valve 10 operates and the inclined rotation angle of the swash plate 2a of the variable capacity-type hydraulic pump 2 is inputted after the pressure oil inside the discharge oil line 7 is diverted to the steering hydraulic cylinder 5 and the flow inside the discharge oil line 7 has actually decreased, the subsequent response is influenced by the responsiveness of the swash plate 2a, and is relatively poorer than that of prior art 1 (FIG. 4 (3), (1)).

FIG. 5 summarizes the points made hereinabove.

In other words, compared to prior art 1 and prior art 2, the first embodiment (present invention 1) can lower energy loss to the same level as that of prior art 2, and can improve the responsiveness of the steering control system to the same level as that of prior art 1.

Next, a second embodiment, which is capable of enhancing the responsiveness of the steering control system even more than the first embodiment described hereinabove will be explained by referring to FIG. 2. Furthermore, in the following explanation, explanations of the constitution that are the same as those in the hydraulic circuit of FIG. 1 will be omitted, and the explanation will focus on different constitutions.

Figure 2:
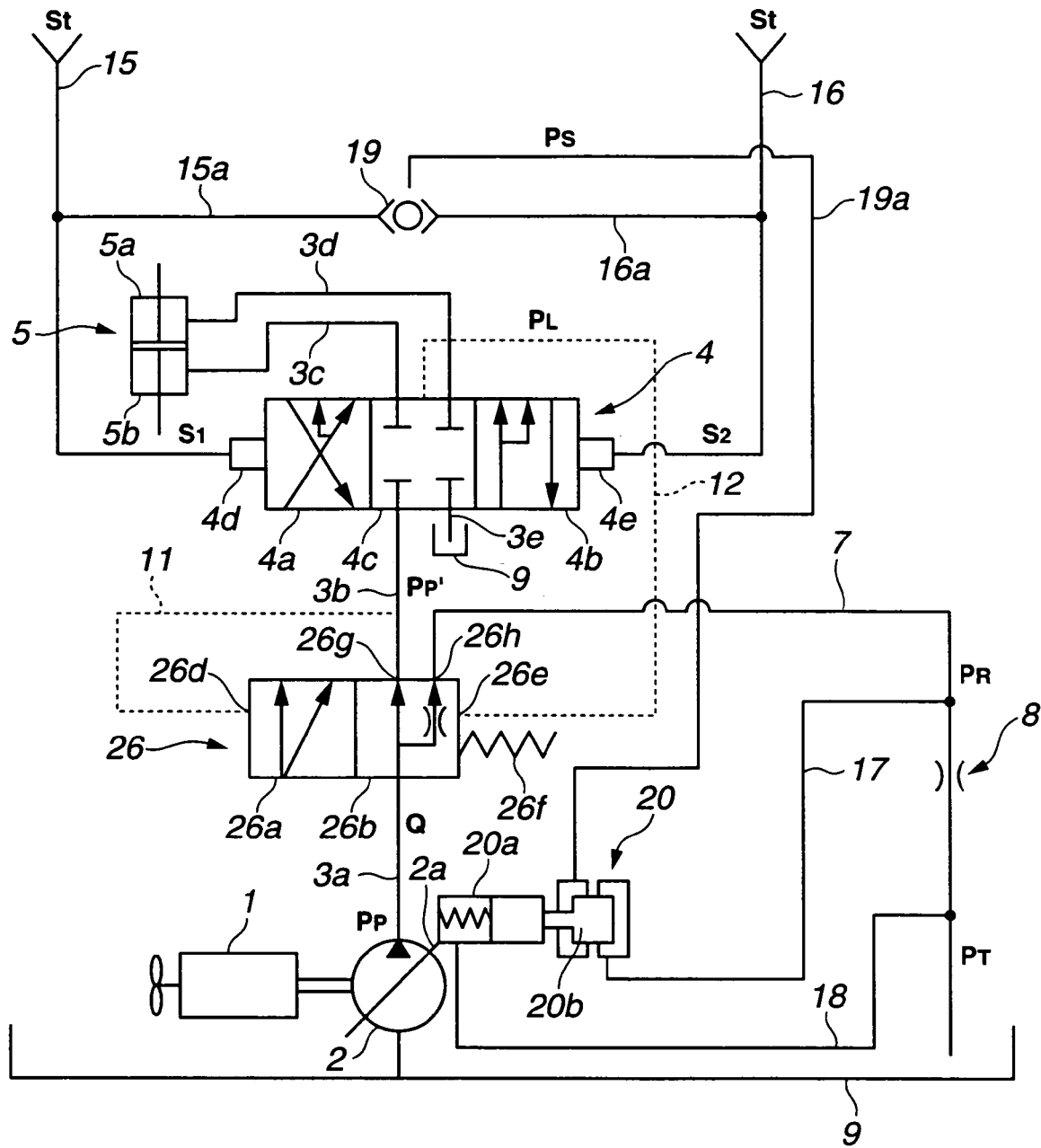
FIG. 2 is a hydraulic circuit diagram of a second embodiment.
Figure 6:
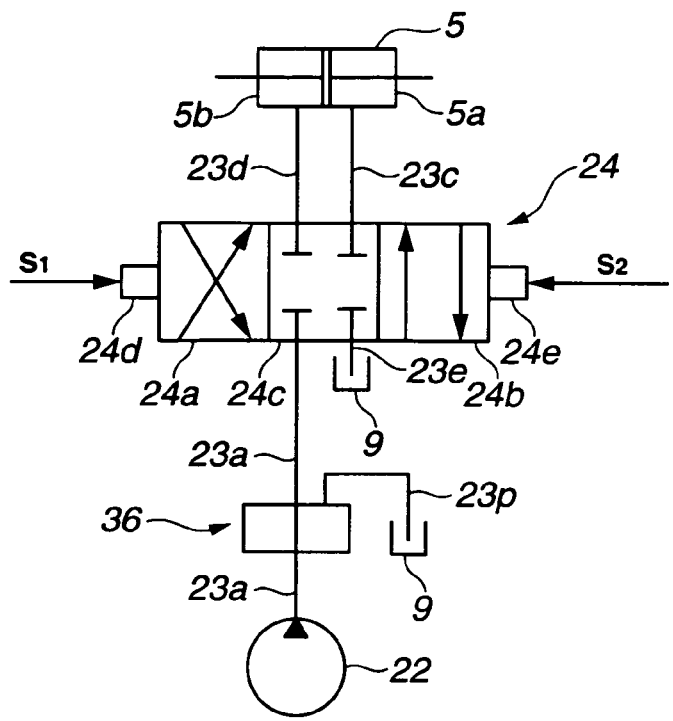
FIG. 6 is a hydraulic circuit diagram used to explain prior art 1.
Figure 7:
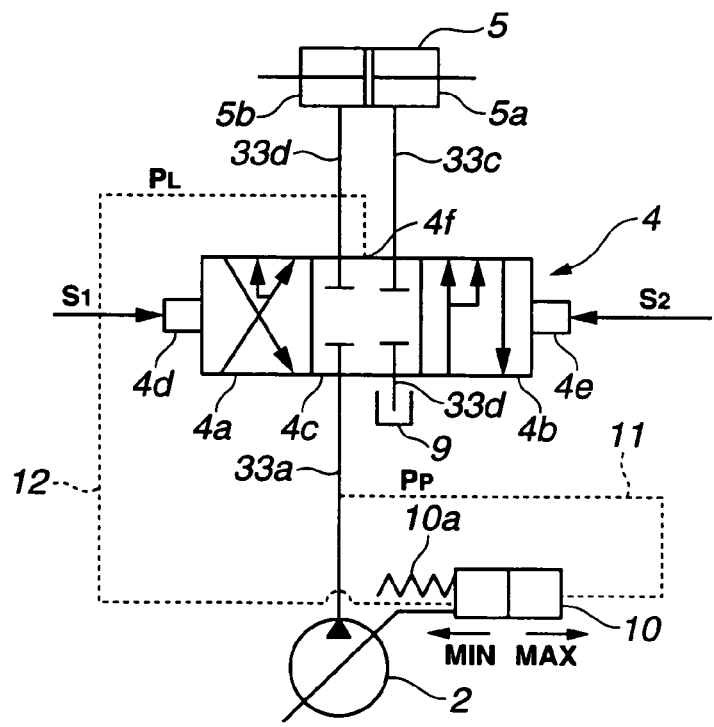
FIG. 7 is a hydraulic circuit diagram used to explain prior art 2.

FIG. 2 shows a steering drive control hydraulic circuit of a second embodiment.

In the hydraulic circuit of FIG. 2, the same flow control valve 26 as that in FIG. 1 is provided.

In other words, a first output port 26g of the flow control valve 26, of the downstream side as seen from the hydraulic pump 2, is linked to oil line 3b, and a second outlet port 26h is linked to the discharge oil line 7.

The flow control valve 26 has valve positions 26a, 26b. Valve position 26a is the valve position for supplying pressure oil to the steering flow control valve 4 via output port 26g and oil line 3b, and for discharging pressure oil to the tank 9 via outlet port 26h and the discharge oil line 7; and valve position 26b is a valve position that has the same functions as valve position 26a, but which reduces the amount of pressure oil discharged to the discharge oil line 7 by virtue of a restrictor disposed inside the valve. A valve position may be added to the flow control valve 26 for enabling pressure oil to be supplied only to the steering flow control valve 4 without supplying it to the discharge oil line 7.

A spring 26f for applying set pressure is disposed on the flow control valve 26. The outlet port 4f of the steering flow control valve 4 is linked via a pilot oil line 12 to a pilot port 26e on the same side as the spring 26f of the flow control valve 26. Oil line 3b is linked via a pilot oil line 11 to a pilot port 26d on the opposite side of the spring 26f of the flow control valve 26.

An oil line 15 branches to an oil line 15a, and this oil line 15a is linked to the one inlet of a shuttle valve 19. Similarly, an oil line 16 branches to an oil line 16a, and this oil line 16a is linked to the other inlet of the shuttle valve 19. The outlet of the shuttle valve 19 is linked to an oil line 19a.

Thus, of the pressure of hydraulic signal S1 of inside oil line 15 and the pressure of hydraulic signal S2 of inside oil line 16, whichever pressure is the greatest (the maximum signal pressure Ps) is outputted to oil line 19a from the shuttle valve 19.

In the hydraulic circuit of FIG. 2, a capacity control valve 20 that is the same as that of FIG. 1 is provided.

That is, a spring 20a for applying a set pressure ΔP is disposed in the capacity control valve 20. The flow of discharge pressure oil flowing through the discharge oil line 7 can be detected as the differential pressure (PR-PT) of the differential pressure across a restrictor 8, that is, the pressure PR of the upstream side of the restrictor 8 (the pressure of the outlet port 26h of the flow control valve 26) and the pressure PT of the downstream side of the restrictor 8 (tank 9 pressure).

A spool 20b is disposed in the capacity control valve 20. The spring 20a acts on the one end of this spool 20b. An oil line 17 is connected to the capacity control valve 20 such that the pressure PR of the upstream side of the restrictor 8 acts on the spool 20b in the opposite direction of the spring force of the spring 20a. Further, oil line 19a is connected to the capacity control valve 20 such that the maximum signal pressure Ps acts on the spool 20b in the same direction as the direction that the spring force of the spring 20a acts on the spool 20b. Similarly, an oil line 18 is connected to the capacity control valve 20 such that the pressure PT of the downstream side of the restrictor 8 acts on the spool 20b in the same direction as the direction that the spring force of the spring 20a acts on the spool 20b.

In accordance with this, the capacity control valve 20 controls the swash plate 2a (capacity) of the variable capacity-type hydraulic pump 2 such that the differential pressure (PR−(PT+PS)) of the pressure PR of the upstream side of the restrictor 8, and a pressure PT+PS that adds the maximum signal pressure PS to the pressure PT of the downstream side of the restrictor 8 constitutes the set pressure ΔP.

The operation of the steering drive control hydraulic circuit of FIG. 2 will be explained.

When a steering handle, steering control lever or other such steering controller is operated, and a steering drive command signal St is generated, either hydraulic signal S1 or S2 corresponding to this steering drive command signal St is applied to either pilot port 4d or 4e of the steering flow control valve 4.

When hydraulic signal S1 is applied to pilot port 4d of steering flow control valve 4, the steering flow control valve 4 is positioned on the side of valve position 4a. Thus, pressure oil delivered from the variable capacity-type hydraulic pump 2 is supplied to oil chamber 5a of the steering hydraulic cylinder 5 by way of oil line 3a, the flow control valve 26, oil line 3b, the steering flow control valve 4 and oil line 3d. Further, the return pressure oil of oil chamber 5b of the steering hydraulic cylinder 5 is discharged by way of oil line 3c, the steering flow control valve 4 and oil line 3e to the tank 9. In accordance with this, for example, the left-turn turning radius of the vehicle changes.

Further, when hydraulic signal S2 is applied to pilot port 4e of the steering flow control valve 4, the steering flow control valve 4 is positioned on the side of valve position 4b. Thus, pressure oil delivered from the variable capacity-type hydraulic pump 2 is supplied to oil chamber 5b of the steering hydraulic cylinder 5 by way of oil line 3a, the flow control valve 26, oil line 3b, the steering flow control valve 4, and oil line 3c. Further, return pressure oil of oil chamber 5a of the steering hydraulic cylinder 5 is discharged to the tank 9 by way of oil line 3d, the steering flow control valve 4 and oil line 3e. In accordance with this, for example, the right-turn turning radius of the vehicle changes.

In the flow control valve 26, the valve position is adjusted such that the differential pressure (Pp'-PL) of the upstream side pressure Pp' of the steering flow control valve 4, which operates via pilot oil line 11, and the downstream side pressure PL (load pressure PL of the steering hydraulic cylinder 5) of the steering flow control valve 4, which operates via pilot oil line 12, corresponds to a set pressure corresponding to the spring force of the spring 6f. A flow corresponding to the aperture area of the steering flow control valve 4 is thereby supplied to the steering hydraulic cylinder 5 regardless of the load of the steering hydraulic cylinder 5.

If it is supposed that the steering controller is now being operated at a normal operating speed, the differential pressure (Pp'-PL) across the steering flow control valve 4 is adjusted so as to substantially correspond to the set pressure, and the surplus flow α flows to the discharge oil line 7.

Here, it is supposed that the steering controller has been operated rapidly. When the steering controller is operated rapidly, the aperture area of the steering flow control valve 4 quickly increases, and the differential pressure (Pp'-PL) across the steering flow control valve 4 rapidly becomes smaller. When the differential pressure (Pp'-PL) across the steering flow control valve 4 rapidly becomes smaller, the flow control valve 26 is biased by the spring force of the spring 6f and quickly moves to the side of valve position 26b to increase the differential pressure (Pp'-PL) and make it correspond to the set pressure. Thus, the pressure oil of the surplus flow α, which up to this point had been flowing to the discharge oil line 7, is rapidly supplied from the flow control valve 26 to the steering hydraulic cylinder 5 via the steering flow control valve 4.

Thus, output Q' rapidly increases in response to the input St (FIG. 4 (4)).

As a result of the pressure oil inside the discharge oil line 7 being diverted to the steering hydraulic cylinder 5, the flow of the pressure oil inside the discharge oil line 7 decreases. Thus, the differential pressure (PR-PT) across the restrictor 8 becomes smaller. When the differential pressure (PR-PT) across the restrictor 8 becomes smaller, the capacity control valve 20 is biased by the spring force of the spring 20a and the spool 20b moves to the right side in the figure to increase the differential pressure (PR-PT) across the restrictor 8, and the swash plate 2a of the variable capacity-type hydraulic pump 2 moves to the maximum inclined rotation angle MAX side. The delivery capacity of the variable capacity-type hydraulic pump 2 is thereby made bigger, and the delivery flow Q is increased, and a flow Q' corresponding to a steering drive command signal St is supplied to the steering hydraulic cylinder 5 (FIG. 4 (4)). Furthermore, because the differential pressure (Pp'-PL) across the steering flow control valve 4 is increased pursuant to the increase of the flow Q' passing through the steering flow control valve 4, the flow control valve 26 reaches equilibrium at the valve position at which the before-and-after differential pressure (Pp'-PL) corresponds to the set pressure, resulting in the surplus flow α once again being discharged to the discharge oil line 7 from the flow control valve 26.

Here, in the hydraulic circuit of FIG. 2, the maximum signal pressure Ps acts on the capacity control valve 20, causing the swash plate 2a of the variable capacity-type hydraulic pump 2 to move to the side of the maximum inclined rotation angle MAX in line with the generation of a steering drive command signal St. In other words, control for starting up the swash plate 2a of the hydraulic pump 2 commences before the flow of pressure oil inside the discharge oil line 7 actually decreases and the differential pressure (PR-PT) across the restrictor 8 actually decreases.

In the above explanation, a signal Ps corresponding to a steering drive command signal St acts on a spool 20b of the capacity control valve 20, and control for increasing the capacity by moving the swash plate 2a of the variable capacity-type hydraulic pump 2 to the side of the maximum inclined rotation angle MAX in accordance with the size of the steering drive command signal St is performed.

However, control for increasing the capacity by moving the swash plate 2a of the variable capacity-type hydraulic pump 2 to the side of the maximum inclined rotation angle MAX in accordance with the size of the steering drive command signal St may also be performed by causing the signal Ps corresponding to a steering drive command signal St to act on the spring 20a of the capacity control valve 20 to change the spring force.

In brief, the constitution is fine as long as it controls the capacity of the variable capacity-type hydraulic pump 2 such that the differential pressure (PR-PL) across the restrictor 8 constitutes the set pressure, and performs control for increasing the capacity of the variable capacity-type hydraulic pump 2 in accordance with the size of a steering drive command signal St.

Further, in the first embodiment shown in FIG. 1 and the second embodiment shown in FIG. 2, the constitution is such that a steering drive command signal St is applied to the steering flow control valve 4 after being converted to a hydraulic signal S1, S2, but the present invention can be constituted such that the steering flow control valve 4 is an electromagnetic control valve, and a steering drive command signal St that is an electric signal can be applied directly to the steering flow control valve 4.

In brief, it does not matter whether the steering drive command signal St is a hydraulic signal or an electric signal, as long as the constitution operates the steering flow control valve 4 in accordance with a steering drive command signal it is fine.

Further, in the second embodiment shown in FIG. 2, the explanation assumed a constitution in which a steering drive command signal St (signal pressure Ps) acts on the capacity control valve 20 as a hydraulic signal, but the constitution may also perform control for increasing the capacity of the variable capacity-type hydraulic pump 2 in accordance with the size of a steering drive command signal St by causing a steering drive command signal St to act on the capacity control valve 20 as an electric signal.

Next, the second embodiment will be compared against prior art 1, prior art 2 and the first embodiment by referring to FIG. 3 and FIG. 4.

As described hereinabove, in the second embodiment, as shown in FIG. 3 (4) (present invention 2), because the delivery flow Q of the hydraulic pump 2 is set such that only the surplus flow α becomes larger than the delivery flow of prior art 2, energy loss is somewhat poorer compared to that of prior art 2; however, energy loss is markedly lower than with prior art 1.

Further, as described hereinabove, in the second embodiment, as shown in FIG. 4 (4) (present invention 2), because the flow control valve 26 operates such that, even when a steering controller is operated rapidly and a steering drive command signal St (input) is rapidly inputted, the pressure oil of the surplus flow α, which has been flowing through the discharge oil line 7, is quickly diverted to the steering hydraulic cylinder 5 in accordance with this rapid input, and the supply flow Q' (output) to the steering hydraulic cylinder 5 follows suit without delay. Thus, the responsiveness of the steering control system is markedly improved compared to prior art 2, and is on a par with that of prior art 1.

Moreover, as described hereinabove, whereas in the first embodiment control for starting up the swash plate 2a of the hydraulic pump 2 commences subsequent to the differential pressure (PR-PT) across the restrictor 8 actually decreasing, in the second embodiment, because control for starting up the swash plate 2a of the hydraulic pump 2 has already begun pursuant to the generation of a steering drive command signal St and there is no delay between the differential pressure (PR-PT) across the restrictor 8 actually decreasing and the swash plate 2a of the hydraulic pump 2 starting up, the responsiveness of the steering control system is improved more than it is in the first invention.

That is, compared to prior art 1 and prior art 2, the second embodiment (present invention 2) can lower energy loss to the same level as that of prior art 2, and can improve the responsiveness of the steering control system to the same level as that of prior art 1, and moreover, can improve this responsiveness even more than the first embodiment (present invention 1).

If applied to a work vehicle, the present invention can lower energy loss while markedly enhancing responsiveness to rapid steering operations. The art of the present invention is not limited to work vehicles, and is useful when applied to ordinary vehicles as well.

What is claimed is:

1. A vehicular steering control device for driving vehicular steering by supplying pressure oil from a variable capacity-type hydraulic pump to a hydraulic actuator for steering through pressure oil supply lines in response to a steering drive command signal, said vehicular steering control device comprising:

a steering flow control valve, which is disposed on said pressure oil supply lines, and which operates such that pressure oil of a flow corresponding to said steering drive command signal is supplied to said steering hydraulic actuator;

a flow control valve, which is disposed on said pressure oil supply line between said variable capacity-type hydraulic pump and said steering flow control valve, and which discharges pressure oil from said variable capacity-type hydraulic pump to a tank via a discharge oil line so that a differential pressure across said steering flow control valve constitutes a set value;

a restrictor disposed on said discharge oil line; and capacity control means for controlling a capacity of said variable capacity-type hydraulic pump such that a differential pressure across said restrictor becomes a set value.

2. A vehicular steering control device for driving vehicular steering by supplying pressure oil from a variable capacity-type hydraulic pump to a hydraulic actuator for steering by way of pressure oil supply lines in response to a steering drive command signal, said vehicular steering control device comprising:

a steering flow control valve, which is disposed on said pressure oil supply lines, and which operates such that pressure oil of a flow corresponding to said steering drive command signal is supplied to said steering hydraulic actuator;

a flow control valve, which is disposed on said pressure oil supply line between said variable capacity-type hydraulic pump and said steering flow control valve, and which discharges pressure oil from said variable capacity-type hydraulic pump to a tank via a discharge oil line so that a differential pressure across said steering flow control valve becomes a set value;

a restrictor disposed on said discharge oil line; and capacity control means for controlling a capacity of said variable capacity-type hydraulic pump such that a differential pressure across said restrictor becomes a set value, and for performing control that increases the capacity of said variable capacity-type hydraulic pump in accordance with a size of said steering drive command signal.

* * * * *